United States Patent [19]

Christe

[11] Patent Number: 4,683,129

[45] Date of Patent: Jul. 28, 1987

[54] PROCESS FOR THE PRODUCTION OF ADVANCED NF$_4$+ SALTS

[75] Inventor: Karl O. Christe, Calabasas, Calif.

[73] Assignee: Rockwell International Corporation, El Segundo, Calif.

[21] Appl. No.: 271,066

[22] Filed: Jun. 5, 1981

[51] Int. Cl.$^4$ ............................................. C01B 21/00
[52] U.S. Cl. .................................... 423/351; 423/414
[58] Field of Search ................................ 423/351, 414

[56] References Cited

U.S. PATENT DOCUMENTS

| | | |
|---|---|---|
| 3,503,719 | 3/1970 | Christe et al. . |
| 3,708,570 | 1/1973 | Tolberg et al. . |
| 3,963,542 | 6/1976 | Pilipovich . |
| 4,102,984 | 7/1978 | Christe et al. ........................ 423/351 |
| 4,107,275 | 8/1978 | Christe et al. ........................ 423/351 |
| 4,108,965 | 8/1978 | Christe ................................. 423/351 |
| 4,152,406 | 5/1979 | Christe et al. . |
| 4,163,773 | 8/1979 | Christe et al. ........................ 423/351 |
| 4,172,881 | 10/1979 | Christe . |
| 4,172,884 | 10/1979 | Christe et al. . |
| 4,207,124 | 6/1980 | Christe . |

OTHER PUBLICATIONS

Schack et al, *J. Fluorine Chem*, in press..
Christe et al, *J. Fluorine Chem.*, 8, 541 (1976).
W. Wilson et al, *J. Fluorine Chem.*, 15, 83(1980).
Christe et al, *J. Fluorine Chem.*, 11, 71(1978).
Yu. I. Nikonorov, Kinetika i Katalie (Eng. Transl.), 20, 1598(1979).
Christe et al, *Inorg. Chem.*, 15, 1275 (1976).

*Primary Examiner*—O. R. Vertiz
*Assistant Examiner*—Wayne A. Langel
*Attorney, Agent, or Firm*—H. Fredrick Hamann; Harry B. Field; David C. Faulkner

[57] ABSTRACT

An improved process for the production of advanced NF$_4$+ salts is described utilizing graphite salts as an HF and oxidizer resistant anion exchange medium.

6 Claims, No Drawings

PROCESS FOR THE PRODUCTION OF ADVANCED NF4+ SALTS

BACKGROUND OF THE INVENTION

1. Field of the Invention

This invention relates to an improved process for the production of advanced $NF_4^+$ salts from $NF_4SbF_6$. Advanced $NF_4^+$ salts are particularly useful for applications, such as solid propellant $NF_3$-$F_2$ gas generators, high detonation pressure explosives, and fluorinating agents for aromatic compounds.

2. Description of the Prior Art

The $NF_4^+$ cation is unique since it combines high oxidizing power with unusual kinetic stability. Furthermore, its synthesis requires unconventional methods. Generally, complex fluoro cations are prepared by $F^-$ abstraction from a parent molecule. In the case of $NF_4^+$, however, the corresponding parent molecule, $NF_5$, does not exist. The chemical synthesis of $NF_4^+$ from $NF_3$ and $F^+$ is precluded by the fact that fluorine is the most electronegative element known and, therefore, $F^+$ cannot be generated by chemical means. This problem was overcome by the discovery that $NF_4^+$ salts can be prepared from $NF_3$, $F_2$ and a strong Lewis acid in the presence of an activation energy source. Although this principle has been demonstrated for several different Lewis acids and activation energy sources, such as heating, glow-discharge, bremsstrahlung and uv-photolysis, the only efficient and economically feasible method for preparing an $NF_4^+$ salt is based on the high temperature and high pressure reaction of $NF_3$ and $F_2$ with either $SbF_5$ or $SbF_3$. Consequently, the only readily accessible $NF_4^+$ salt is $NF_4^+SbF_6^-$. Since the $SbF_6^-$ anion is heavy and of low energy, it is undesirable for most practical applications and must be substituted by lighter or more energetic anions. Whereas the replacement of a weaker Lewis acid, such as $BF_3$, by a stronger Lewis acid, such as $PF_5$, $AsF_5$ or $SbF_5$, can be readily achieved by a simple displacement reaction, $$NF_4BF_4 + PF_5 \rightarrow NF_4PF_6 + BF_3$$

the reverse reaction, i.e. the displacement of $SbF_6^-$ by $BF_3$ is not possible. Based on the state of the art, substitution of $SbF_6^-$ in $NF_4^+SbF_6^-$ is best achieved by metathetical processes in anhydrous HF, taking advantage of the relatively low solubility of alkali metal $SbF_6^-$ salts. A typical example is the synthesis of $NF_4BF_4$ from $NF_4SbF_6$ according to:

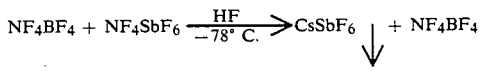

Among the major drawbacks of this process are: (i) the purity of the resulting $NF_4BF_4$ product is only about 80–90%; (ii) the yield of $NF_4BF_4$ is usually only 60 to 80% due to hang-up of mother liquor in the filter cake; (iii) cesium salts are expensive; (iv) the process must be carried out in a batch-type fashion; (v) the process requires low-temperature operations and cumbersome filtration steps.

SUMMARY OF THE INVENTION

Accordingly, there is provided by the present invention an improved process for the production of advanced $VF_4^+$ salts wherein graphite salts can be used for exchanging the $SbF_6^-$ anion in $NF_4SbF_6$ for other, more desirable anions, such as $BF_4^-$ or $AsF_6^-$ according to:

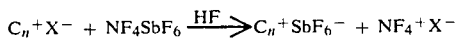

OBJECTS OF THE INVENTION

Therefore, it is an object of the present invention to provide an improved los-cost process for the production of advanced $NF_4^+$ salts in high purity and yield from $NF_4SbF_6$ using graphite salts as an anion exchange medium.

Another object of the present invention is to provide pure $NF_4^+$ salts, so as to avoid the need for costly recrystalization steps from exotic solvents.

Yet another object of the present invention is to provide quantitative yields of $NF_4^+$ salts.

Still a further object of the present invention is to provide low-cost $NF_4^+$ salts which result from the fact the expensive cesium salts are replaced by the cheaper graphite salts.

Another object of the present invention is to provide a continuous operation process.

A further object of the present invention is to provide a means for eliminating cooling or cumbersome low temperature filtration steps.

Other objects, advantages and novel features of the present invention will become apparent from the following detailed description of the invention.

DESCRIPTION OF THE PREFERRED EMBODIMENTS

In accordance with the present invention it has been found that graphite salts can be used for exchanging the $SbF_6^-$ anion in $NF_4SbF_6$ for other, more desirable anions according to:

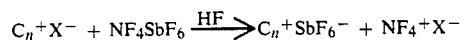

Those $X^-$ anions include the advanced $NF_4^+$ salt anions which include but are not limited to $BF_4^-$, $SiF_6^{-2}$, $PF_6^-$, $GeF_5^-$, $AsF_6^-$, $SO_3F^-$, $ClO_4^-$, $GeF_6^{-2}$, $SeF_5O^-$, $TeF_5O^-$, $SnF_5^-$, $BiF_6^-$, $SnF_6^{-2}$, $MnF_6^{-2}$, $NiF_6^{-2}$, $TiF_6^{-2}$, $Ti_2F_{10}^{-2}$, $IF_4O_2^-$, $WOF_5^-$, $WF_6^-$, $WF_7^-$, $UF_5O^-$, and $UF_7^-$. The preferred salts include $BF_4^-$, $SiF_6^{-2}$, $PF_6^-$, $GeF_5^-$, $AsF_6^-$, $SO_3F^-$, $ClO_4^-$, $GeF_6^{-2}$, $SnF_5^-$, $BiF_6^-$, $SnF_6^{-2}$, $MnF_6^{-2}$, $NiF_6^{-2}$, $TiF_6^{-2}$, $Ti_2F_{10}^{-2}$, $IF_4O_2$, $UOF_5^-$, $WF_6^-$, $WF_7^-$, $UF_5O^-$, and $UF_7^-$. The most preferred salts include $BF_4^-$ or $AsF_6^-$.

The preferred graphite cations $C_n^+$ include those wherein n is equal or greater than about six ($n \gtrsim 6$), and the preferred range n lies between about 6 and about 12.

Since the graphite salts have structures consisting of polymeric graphite sheets with intercalated mobile monomeric anions, these graphite salts are totally insoluble in HF, but can readily release their anions in the form of soluble $NF_4^+$ salts. Compared to the state of the art metathetical reactions, the novel process based on graphite salts offers the following significant improvements: (i) pure $NF_4^+$ salts are obtained thus avoiding the need for costly recrystallization steps from exotic solvents, such as $BrF_5$; (ii) the yields are quantitative, i.e. no $NF_4^+$ values are lost; (iii) the cost is lower because expensive cesium salts are replaced by the cheaper graphite; (iv) the process can be operated in a continuous manner, if desired; (v) cooling or cumbersome low-temperature filtration steps are not required.

The general applicability of this novel graphite based process was demonstrated by preparing advanced $NF_4^+$ salts containing either tetrahedral or octahedral anions using $NF_4SbF_6$ and the corresponding graphite salts as starting materials.

Using appropriate regeneration schemes, such as pyrolysis of the spent graphite salt or regeneration with $Na^+X^-$, the following process cycles, written for illustrative purposes for $NF_4BF_4$, are possible:

Cycle I $$(C_n + 0.5 F_2 + BF_3 \rightarrow C_n^+BF_4^-) \quad \text{start up reaction}$$
$$C_nF + BF_3 \rightarrow C_n^+BF_4^-$$
$$NF_3 + F_2 + SbF_5 \rightarrow NF_4^+SbF_6^-$$
$$C_n^+BF_4^- + NF_4^+SbF_6^- \rightarrow C_n^+SbF_6^- + NF_4^+BF_4^-$$
$$\underline{C_n^+SbF_6^- \rightarrow C_nF + SbF_5}$$
$$NF_3 + F_2 + BF_3 \rightarrow NF_4BF_4$$

and

Cycle II $$(C_n + 0.5 F_2 + BF_3 \rightarrow C_n^+BF_4^-) \quad \text{start up reaction}$$
$$NF_3 + F_2 + SbF_5 \rightarrow NF_4^+SbF_6^-$$
$$C_n^+BF_4^- + NF_4SbF_6 \rightarrow C_n^+SbF_6^- + NF_4^+BF_4^-$$
$$C_n^+SbF_6^- + NaBF_4 \rightarrow C_n^+BF_4^- + Na^+SbF_6^-$$
$$Na^+SbF_6^- \rightarrow NaF + SbF_5$$
$$\underline{NaF + BF_3 \rightarrow NaBF_4}$$
$$NF_3 + F_2 + BF_3 \rightarrow NF_4BF_4$$

As can be seen from these examples, the net reaction is the formation of $NF_4BF_4$ from $NF_3$, $F_2$, and $BF_3$ with all by-products being completely recyclable. Prior to this invention, this reaction could only be achieved in very low yields under extreme conditions, such as low-temperature photolysis, radiolysis or glow-discharge, at a prohibitive cost.

By way of illustration example and not limitation the following two examples are given:

EXAMPLE I

A sample of $C_{11}^+BF_4^-$ (3.08 g) prepared from graphite, $BF_3$ and $F_2$ by the method of Nikonorov, was placed into an exchange column consisting of ¼" od heavy wall Teflon-PFA tubing. The column was soaked with liquid anhydrous HF. Then 1.6 g (4.91 mmol) of $NF_4SbF_6$ dissolved in 8 ml of anhydrous HF was slowly passed at ambient temperature through the column. The column was washed with 5 ml of anhydrous HF and the HF solutions were collected in a Teflon receiver. The HF solvent was pumped off at ambient temperature, leaving behind 4.9 mmol of spectroscopically pure $NF_4BF_4$ having properties identical to those reported in the literature.

EXAMPLE II

A sample of 5.0 mmol of $NF_4SbF_6$ dissolved in 8 ml of anhydrous HF was passed, as described in Example I, through a column containing 3.5 g of $C_9^+AsF_6^-$. The solid residue isolated from the collected effluent consisted of 5.0 mmol of spectroscopically pure $NF_4As_6$ having properties identical to those reported in the literature.

Obviously, numerous variations and modifications may be made without departing from the present invention. Accordingly, it should be clearly understood that the forms of the present invention described above are illustrative only and are not intended to limit the scope of the present invention.

What is claimed and desired to be secured by Letters Patent of the United States is:

1. The method of exchanging the anion in an $NF_4^+$ salt by ion exchange and in accordance with the following reaction:

$$C_n^+X^- + NF_4SbF_6 \xrightarrow{HF} C_nSbF_6^- + NF_4^+X^-$$

wherein $C_n^+$ is a graphite cation and $X^-$ is an advanced $NF_4^+$ salt anion.

2. The method of claim 1 wherein $X^-$ is selected from the group consisting of:
$BF_4^-$, $SiF_6^{-2}$, $PF_6^-$, $GeF_6^-$, $AsF_6^-$, $SO_3F^-$, $ClO_4^-$, $GeF_6^{-2}$, $SeF_5O^-$, $TeF_5O^-$, $SnF_5^-$, $BiF_6^-$, $SnF_6^{-2}$, $MnF_6^{-2}$, $NiF_6^{-2}$, $TiF_6^{-2}$, $Ti_2F_{10}^{-2}$, $IF_4O_2^-$, $WOF_5^-$, $WF_6^-$, $WF_7^-$, $UF_5O^-$, and $UF_7^-$.

3. The method of claim 2 wherein $X^-$ is selected from the group consisting of:
$BF_4^-$, $SiF_6^{-2}$, $PF_6^-$, $GeF_5^-$, $AsF_6^-$, $SO_3F^-$, $ClO_4^-$, $GeF_6^{-2}$, $SnF_5^-$, $BiF_6^-$, $SnF_6^{-2}$, $MnF_6^{-2}$, $NiF_6^{-2}$, $TiF_6^{-2}$, $Ti_2F_{10}^{-2}$, $IF_4O_2^-$, $UOF_5^-$, $WF_6^-$, $WF_7^-$, $UF_5O^-$ and $UF_7^-$.

4. The method of claim 3 wherein $X^-$ is selected from the group consisting of $BF_4^-$ and $AsF_6^-$.

5. The method of claim 1 wherein n is equal to or greater than about 6.

6. The method of claim 5 wherein n lies between about 6 and about 12.

* * * * *